United States Patent
Gupta

(10) Patent No.: US 12,428,043 B2
(45) Date of Patent: Sep. 30, 2025

(54) SYSTEM AND METHOD FOR ESTABLISHING VEHICLE DISTRIBUTED POWER ARRANGEMENT

(71) Applicant: Westinghouse Air Brake Technologies Corporation, Pittsburgh, PA (US)

(72) Inventor: Jitendra Gupta, Bengaluru (IN)

(73) Assignee: Westinghouse Air Brake Technologies Corporation, Pittsburgh, PA (US)

( * ) Notice: Subject to any disclaimer, the term of this patent is extended or adjusted under 35 U.S.C. 154(b) by 972 days.

(21) Appl. No.: 17/379,452

(22) Filed: Jul. 19, 2021

(65) Prior Publication Data

US 2022/0032977 A1 Feb. 3, 2022

Related U.S. Application Data

(60) Provisional application No. 63/059,509, filed on Jul. 31, 2020.

(51) Int. Cl.
*B61L 15/00* (2006.01)
*B60K 35/00* (2006.01)
(Continued)

(52) U.S. Cl.
CPC .......... *B61L 15/0018* (2013.01); *B60K 35/00* (2013.01); *B61L 15/0027* (2013.01);
(Continued)

(58) Field of Classification Search
CPC ............. B61L 15/0018; B61L 15/0062; B61L 15/0063; B61L 15/009; B61L 15/0027;
(Continued)

(56) References Cited

U.S. PATENT DOCUMENTS

| 8,073,582 B2 | 12/2011 | Kellner et al. |
| 9,862,392 B2 | 1/2018 | Schoenly et al. |
| | (Continued) | |

FOREIGN PATENT DOCUMENTS

| CN | 101128338 A | 2/2008 |
| WO | 2014004003 | 1/2014 |
| WO | 2014004003 A2 | 1/2014 |

OTHER PUBLICATIONS

Examination report for related Australian Patent Application No. 2021206920 dated Jul. 25, 2022 (5 pages).

(Continued)

*Primary Examiner* — S. Joseph Morano
*Assistant Examiner* — James William Jones
(74) *Attorney, Agent, or Firm* — K&L Gates LLP

(57) ABSTRACT

A distributed power system includes a communication device and a control device. The communication device is configured to be disposed onboard a first vehicle of a vehicle system that also includes at least a second vehicle. The communication device is configured to communicate a discover message. The control device is configured to be operatively connected to the communication device, and, responsive to the communication device receiving a discover reply message from a second vehicle, to generate a configure message for the communication device to transmit to the second vehicle based on an identifier of the second vehicle included in the discover reply message. The configure message includes instructions for the second vehicle to transition to a remote mode of operation in which remote control of tractive and braking efforts of the second vehicle is enabled.

19 Claims, 2 Drawing Sheets

(51) Int. Cl.
  *B61L 25/02* (2006.01)
  *G05B 19/042* (2006.01)

(52) U.S. Cl.
  CPC ....... *B61L 15/0054* (2013.01); *B61L 15/0058* (2024.01); *B61L 15/0062* (2024.01); *B61L 15/0063* (2013.01); *B61L 15/009* (2013.01); *B61L 25/028* (2013.01); *G05B 19/0423* (2013.01)

(58) Field of Classification Search
  CPC ............. B61L 15/0054; B61L 15/0058; B61L 25/028; B60K 35/00; G05B 19/0423; G05B 2219/23051
  USPC ...................................................... 246/473 R
  See application file for complete search history.

(56) References Cited

U.S. PATENT DOCUMENTS

| | | | |
|---|---|---|---|
| 10,173,698 B2 | 1/2019 | Schoenly et al. | |
| 10,331,121 B2* | 6/2019 | Cooper | H04W 76/11 |
| 10,464,579 B2* | 11/2019 | Cooper | B60L 15/38 |
| 10,479,382 B2 | 11/2019 | Bender et al. | |
| 2003/0214417 A1* | 11/2003 | Peltz | B61L 25/028 340/4.3 |
| 2005/0189815 A1* | 9/2005 | Bryant | B61C 17/12 303/3 |
| 2007/0282494 A1 | 12/2007 | Moffitt et al. | |
| 2009/0204278 A1 | 8/2009 | Kellner et al. | |
| 2009/0292411 A1 | 11/2009 | Smith et al. | |
| 2010/0130124 A1* | 5/2010 | Teeter | B61L 15/0027 455/15 |
| 2014/0005915 A1* | 1/2014 | Smith | B61C 17/12 701/117 |
| 2015/0025712 A1 | 1/2015 | Rush et al. | |
| 2016/0229432 A1 | 8/2016 | Kellner et al. | |
| 2016/0339929 A1 | 11/2016 | Schoenly et al. | |
| 2017/0096154 A1* | 4/2017 | Hurst | G09B 9/04 |
| 2017/0106888 A1* | 4/2017 | Shubs, Jr. | B61L 27/57 |
| 2017/0272351 A1* | 9/2017 | Wolf | B61L 15/0036 |
| 2018/0037241 A1* | 2/2018 | Sharma | B61L 15/0058 |
| 2018/0052455 A1* | 2/2018 | Hutchins | B61L 15/0027 |
| 2018/0118238 A1* | 5/2018 | de Albuquerque Gleizer | B61L 15/0062 |
| 2018/0170415 A1* | 6/2018 | Oswald | B61L 25/023 |
| 2018/0290674 A1* | 10/2018 | Bender | B61L 15/0027 |
| 2018/0322791 A1* | 11/2018 | Brooks | B61L 15/0072 |
| 2019/0168728 A1* | 6/2019 | Venkatasubramanian | B60T 13/665 |
| 2019/0263430 A1 | 8/2019 | Smith et al. | |
| 2019/0276055 A1 | 9/2019 | Cooper et al. | |
| 2020/0154452 A1* | 5/2020 | Bush | H04L 67/62 |
| 2020/0324798 A1* | 10/2020 | Beltramin | B61L 15/0072 |
| 2022/0250665 A1* | 8/2022 | Canigliula | B61L 27/33 |

OTHER PUBLICATIONS

First Examination Report for related Indian Patent Application No. 202114032920 dated Mar. 24, 2022 (6 pages).
First Office Action for related CN Patent Application No. 202110878821.5 dated Dec. 21, 2023 (35 pages).

* cited by examiner

SYSTEM AND METHOD FOR ESTABLISHING VEHICLE DISTRIBUTED POWER ARRANGEMENT

CROSS-REFERENCE TO RELATED APPLICATIONS

This application is a non-provisional conversion of, and claims priority to, U.S. Provisional Application No. 63/059,509, filed Jul. 31, 2020, which is incorporated by reference herein in its entirety.

BACKGROUND

Technical Field

The subject matter herein describes embodiments relating to communications between vehicles, such as communications for vehicle control.

Discussion of Art

Distributed power refers to an arrangement in which the movement of one or more propulsion-generating vehicles of a vehicle system is remotely controlled by control signals communicated from another vehicle in the vehicle system, e.g., another propulsion-generating vehicle of the vehicle system. The distributed power arrangement requires configuring the propulsion-generating vehicles to have different specific roles and then establishing a communication link between the vehicles. The roles include a lead (or master) designation for the vehicle that is going to issue the control signals and a remote (or slave) designation for each of the vehicles that are going to receive the control signals from the lead vehicle. During travel of the vehicles along the route, the lead vehicle can generate and communicate control signals to the remote vehicle or vehicles via the communication link. Upon receipt, the respective remote vehicle implements the control signals such that the movement of the remote vehicle is controlled by the lead vehicle, without requiring manual input onboard the remote vehicle.

Typically, setting up the distributed power arrangement requires manual intervention at each of the vehicles selected to participate in the arrangement. For example, a human operator physically enters each vehicle designated as a remote and input, in the vehicle control system, an address or contact number for the vehicle that is designated as lead. In addition to identifying the lead, the operator onboard the vehicle also reconfigures the vehicle from a conventional mode of operation to a remote distributed power mode of operation. In the conventional mode of operation, control inputs entered onboard the vehicle, such as throttle settings and brake settings, are used to control the movement of the vehicle. In the remote distributed power mode of operation, onboard control inputs are generally ignored except for limited circumstances such as emergency brake applications. After setting up the vehicles designated for remote operation, the operator may then enter the vehicle designated as lead and input respective identifiers and/or contact numbers for the designated remote vehicles before initiating the linking process between the vehicles. The linking process to establish the communication link utilizes the information entered by the operator in the vehicles to enable the vehicles to establish communication with each other that will be used during travel.

The conventional set-up process described above is time and manpower intensive. For example, the various vehicles in the distributed power arrangement may be spaced apart by tens or even hundreds of yards, so the one or more operators may walk a significant distance to enter and configure each of the vehicles for distributed power modes of operation. Furthermore, the set-up process is prone to human error. If the operator incorrectly enters information on one of the remote vehicles or on the lead vehicle, the linking process will fail. It may also be difficult for an operator to troubleshoot the failed linking process to identify the mistake in the entered contact number. Linking failure could result from other causes, such as communication loss between vehicles. For example, failed linking may prompt the operator to repeat the entire process in an attempt to rule out human error as the culprit, which further exacerbates the time and manpower expense.

BRIEF DESCRIPTION

In one or more embodiments, a system (e.g., a distributed power system) is provided that includes a communication device and a control device. The communication device is configured to be disposed onboard a first vehicle of a vehicle system that also includes at least a second vehicle. The communication device is configured to communicate a discover message. The control device is configured to be operatively connected to the communication device, and, responsive to the communication device receiving a discover reply message from a second vehicle, to generate a configure message for the communication device to transmit to the second vehicle based on an identifier of the second vehicle included in the discover reply message. The configure message includes instructions for the second vehicle to transition to a remote mode of operation in which remote control of tractive and braking efforts of the second vehicle along a route is enabled.

In one or more embodiments, a method for establishing a vehicle distributed power arrangement is provided. The method includes communicating a discover message from a first vehicle and receiving a discover reply message at the first vehicle. The discover reply message includes an identifier of a second vehicle from which the discover reply message is communicated. The method also includes communicating a configure message from the first vehicle to the second vehicle based on the identifier in the discover reply message. The configure message instructs the second vehicle to transition to a remote mode of operation in which remote control of tractive and braking efforts of the second vehicle along a route is enabled.

In one or more embodiments, a method for establishing a vehicle distributed power arrangement is provided. The method includes scanning, at a radio onboard a first vehicle, multiple channels in a frequency range to detect a discover message communicated from a second vehicle. Responsive to detecting the discover message in the frequency range, the method includes communicating a discover reply message from the first vehicle to the second vehicle. The discover reply message includes an identifier of the first vehicle. The method also includes receiving a configure message at the first vehicle from the second vehicle subsequent to communicating the discover reply message, and, responsive to receiving the configure message, configuring the first vehicle in a remote mode of operation in which remote control of tractive and braking efforts of the first vehicle is enabled.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
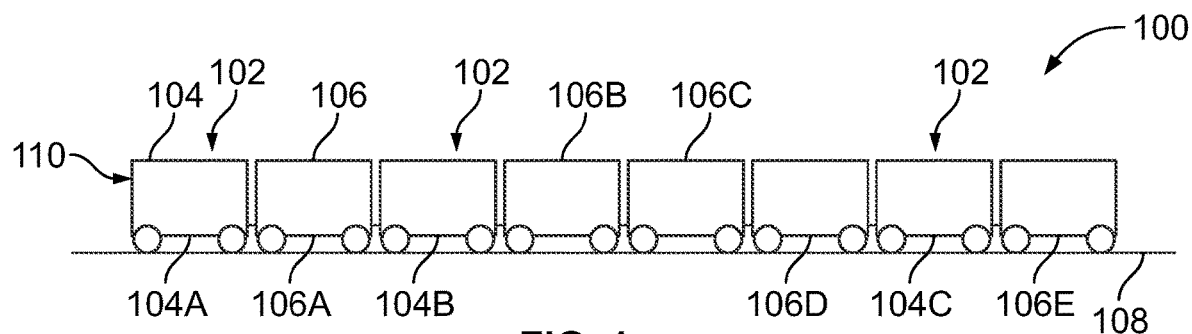
FIG. 1 illustrates a vehicle system on which a distributed power system according to one or more embodiments herein can be implemented.

One or more embodiments described herein are directed to a system and method for discovering and configuring vehicles for distributed power. The system, also referred to herein as a distributed power system, is used to discover vehicles that are available for incorporation into a distributed power arrangement. The distributed power system also configures at least some of the discovered vehicles in the remote mode of operation. The remote mode of operation refers to a remotely-enabled state such that the vehicle in the remote mode can implement control signals received from another vehicle to control movement of the vehicle in the remote mode.

In one or more embodiments, the discovery and configuration procedure is more automated than the conventional set-up process. For example, an operator utilizing the distributed power system and method described herein does not need to physically access or approach any of the vehicles designated as remote. The operator may merely select a button or other input mechanism to initiate the discovery process by the vehicle designated as lead. In response to initiation, the discovery process is entirely automatic and results in a list of one or more vehicles that are available to be configured for distributed power. The available vehicles may include vehicles within a designated proximity of the vehicle designated as the lead role, vehicles that are stationary (e.g., not moving), vehicles that are in the conventional mode of operation, and/or the like. Optionally, the distributed power system may present one or more opportunities for manual selection and confirmation during the set-up procedure, but the actual configuration and linking process to establish the distributed power arrangement is automated.

At least one technical effect of the distributed power system and method disclosed herein is a reduced manual demand because operators are no longer required to enter all of the vehicles and enter contact addresses or numbers of other vehicles with which to communicate for linking. Due to the automated discovery and configuration, the embodiments described herein can establish the distributed power arrangement in significantly less time than the conventional process. Another technical effect may be increased safety that is inherent by not requiring an operator to walk along the route and climb into each of multiple vehicles. Yet another technical effect is improved efficiency in the set-up process attributable to avoiding human errors. For example, because the system and method described herein do not require an operator to manually enter information, such as contact addresses or numbers, there is no risk of incorrect inputs. The efficiency improves by increasing the linking success rate and, even in the event of a linking failure, the cause of the failure would be easier to pinpoint without human error being one of the possible causes. Another benefit is that the distributed power system and method utilizes existing hardware components onboard the vehicles and does not require additional components in order to implement the automated discovery and configuration of remote vehicles for distributed power arrangements.

FIG. 1 illustrates a vehicle system 100 on which a distributed power system according to one or more embodiments herein can be implemented. The vehicle system includes several vehicles 104, 106 that travel along a route 108. The vehicles 104 (e.g., the vehicles 104A-C) represent propulsion-generating vehicles that generate tractive effort or power in order to propel the vehicle system along the route. The vehicles 106 (e.g., the vehicles 106A-E) represent non-propulsion generating vehicles that do not generate tractive effort or power. Some of the non-propulsion-generating vehicles may be disposed between propulsion-generating vehicles. The non-propulsion-generating vehicles include brake systems but lack propulsion systems. The non-propulsion-generating vehicles may be mechanically coupled to each other and to the propulsion-generating vehicles, such that the propulsion-generating vehicles propel the non-propulsion-generating vehicles along the route. The vehicle system may have as few as two propulsion-generating vehicles and as few as zero non-propulsion-generating vehicles. The vehicle system also may include more vehicles than shown in FIG. 1. In the illustrated embodiment, all of the vehicles are mechanically coupled to travel together along the route. In an alternative embodiment, the propulsion-generating vehicles are mechanically separate (e.g., are not directly or indirectly mechanically coupled to each other). For example, the propulsion-generating vehicles may be communicatively connected to each other only, such as through wireless communication.

In one non-limiting embodiment, the vehicle system is a train, and the route is a railroad track. The propulsion-generating vehicles are locomotives. The three locomotives shown in FIG. 1 may represent a consist 102. The non-propulsion-generating vehicles can be rail cars that carry cargo and/or passengers. In another non-limiting embodiment, the vehicle system is a road train, and the route is a road or path. For example, the propulsion-generating vehicles may be trucks (e.g., highway semi-trucks, mining trucks, logging trucks, or the like), and the non-propulsion-generating vehicles may be trailers coupled to the trucks. In yet other embodiments, the vehicles may be other types of vehicles such as vans, cars, motorcycles, boats, and the like, which may be mechanically connected or mechanically separate.

The vehicle system is configured to operate in a distributed power arrangement in which control signals generated from one of the propulsion-generating vehicles designated as lead are communicated to one or more other propulsion-generating vehicles designated as remote to control the movement of the remote propulsion-generating vehicle(s). For example, the first propulsion-generating vehicle 104A may be designated as a lead vehicle that generates control signals for controlling the movement of the second propulsion-generating vehicle 104B and the third propulsion-generating vehicle 104C. The lead propulsion-generating vehicle is disposed at a front end 110 of the vehicle system in FIG. 1 but may have another position in the vehicle system in another embodiment. Prior to the lead vehicle controlling tractive and braking efforts of the remote vehicles to control the movement of the vehicle system along the route, the distributed power arrangement must be set up or established. The distributed power system and method described herein is used to set up or establish the distributed power arrangement prior to movement of the vehicle system along the route.

Figure 2:
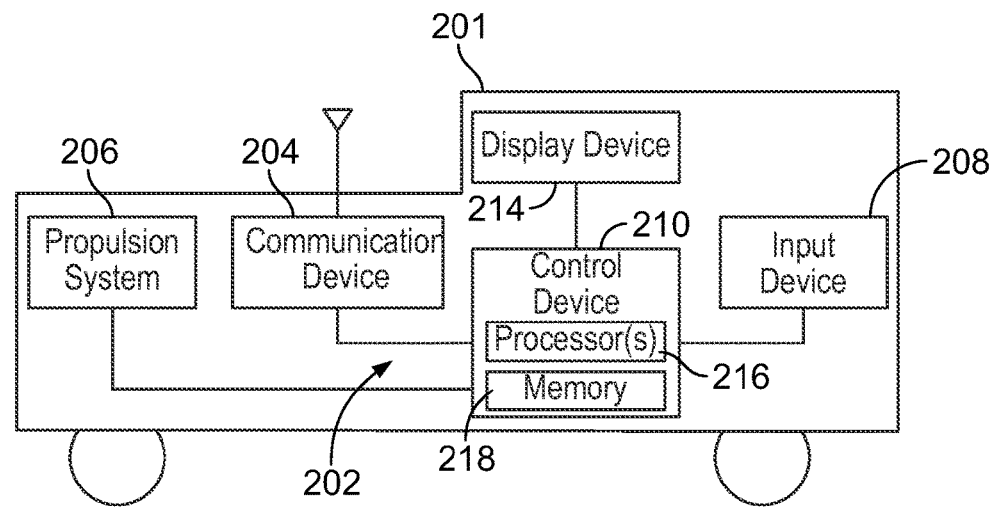
FIG. 2 is a schematic illustration of a propulsion-generating vehicle that defines at least a portion of a distributed power system according to an embodiment.

FIG. 2 is a schematic illustration of a propulsion-generating vehicle 201 that defines at least a portion of a distributed power system 202 according to an embodiment. The propulsion-generating vehicle (hereafter referred to simply as vehicle) includes a communication device 204, a propulsion system 206, an input device 208, a control device 210, and a display device 214 disposed onboard. The control device 210 is operably connected to the communication device, the propulsion system, the input device, and the display device via wired and/or wireless communication pathways.

The communication device onboard the vehicle represents hardware circuitry that can wirelessly communicate electrical signals. For example, the communication device can represent transceiving circuitry, one or more antennas, and the like. The transceiving circuitry may include a transceiver or a separate transmitter and receiver. The electrical signals can form data packets that in the aggregate represent messages. In an embodiment, the communication device is a radio that wirelessly communicates the electrical signals as radio frequency (RF) signals. The communication device can transmit or broadcast messages that are generated by the control device. The communication device can also receive messages and forward to the control device for analysis of the received messages.

The control device performs at least some of the operations described herein to establish the distributed power arrangement between the vehicles. The control device represents hardware circuitry that includes and/or is connected with one or more processors 216 (e.g., one or more microprocessors, integrated circuits, microcontrollers, field programmable gate arrays, etc.). The control device includes and/or is connected with a tangible and non-transitory computer-readable storage medium (e.g., memory) 218 disposed onboard the vehicle. For example, the memory may store programmed instructions (e.g., software) that is executed by the one or more processors to perform the operations of the control device described herein. The memory additionally or alternatively may store different information, such as a route database, a trip schedule, a vehicle makeup or manifest, and/or the like.

The input device can represent or include a workstation computer, tablet computer, handheld computer, keyboard, touchpad, joystick, hand brake, steering wheel, throttle lever, throttle and/or brake pedal, and the like for enabling an operator to interact with the systems onboard the vehicle. The display device can be an integrated display screen onboard the vehicle and/or a display screen on a personal, tablet, or handheld computer (e.g., smartphone). The propulsion system represents the hardware components that are used to provide work for propelling and slowing the vehicle along the route. The propulsion system can include one or more traction motors, inverters, combustion engines, battery systems, air brake systems, friction brake systems, dynamic brake systems, and the like.

The vehicle shown in FIG. 2 can be selectively configured in conventional mode, remote distributed power mode, or lead distributed power mode. Conventional mode is the traditional control set-up in which tractive and brake settings selected onboard the vehicle, through the use of the input device for example, are implemented by the propulsion system to control movement of the vehicle. For example, if an operator pulls a lever to increase the throttle setting, the propulsion system responds by accelerating the vehicle. In the remote distributed power mode, the control device implements control signals received by a vehicle that is designated as the lead vehicle, and essentially disables or blocks all non-emergency control inputs entered onboard the vehicle. For example, if the operator onboard the vehicle pulls the lever to increase the throttle setting while the vehicle is in the remote distributed power mode, the control device would ignore the input. Optionally, the control device may generate a notification that is displayed on the display device to indicate to the operator that the vehicle is in the remote mode. In the lead distributed power mode, the control inputs received onboard the vehicle, such as via the input device or a trip plan that is stored in the memory, are implemented by the vehicle and are also remotely communicated by the communication device to the remote vehicles for implementation by the remote vehicles. The tractive and braking settings assigned to the various vehicles in the distributed power arrangement may be the same, such that all vehicles move in unison, or different such that tractive effort and braking is allocated based in part on location of the vehicles along the length of the vehicle system.

The vehicle shown in FIG. 2 may represent any of the propulsion-generating vehicles 104A-C shown in the vehicle system of FIG. 1. For example, the different propulsion-generating vehicles in the vehicle system may each have the components shown in FIG. 2. In an embodiment, any of the propulsion-generating vehicles can be selectively configured in conventional mode, remote distributed power mode, or lead distributed power mode.

The distributed power system 202 includes various components of the vehicles form the distributed power arrangement. For example, the distributed power system 202 includes the control device, the communication device, and optionally also the display device and input device of each of the vehicles in the distributed power arrangement, as described in more detail herein.

Figure 3:
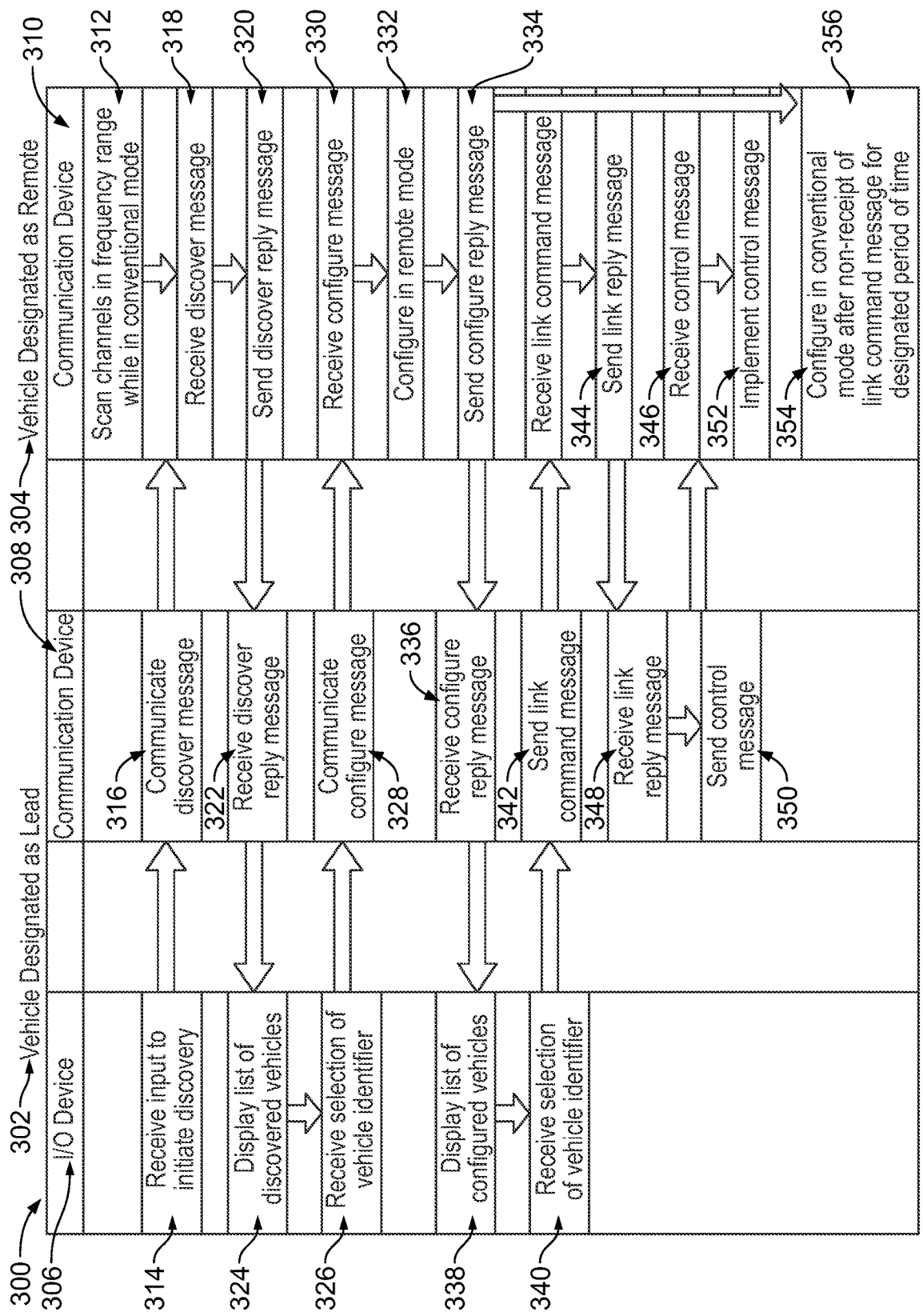
FIG. 3 is a swim lane diagram of a method for establishing a distributed power arrangement between at least two propulsion-generating vehicles according to an embodiment.

FIG. 3 is a swim lane diagram of a method 300 for establishing a distributed power arrangement between at least two propulsion-generating vehicles according to an embodiment. The method for establishing the distributed power arrangement includes discovery of available vehicles and configuration of one or more of the available vehicles in the remote operating mode. The method also includes a linking process between the lead vehicle and the one or more remote vehicles, and can also include controlled movement of the vehicles along a route.

The diagram shows two vehicles, a first vehicle 302 and a second vehicle 304. The first vehicle is designated as lead, such that the first vehicle will assume the lead distributed power mode. The second vehicle is designated as remote, such that the second vehicle will assume the remote distributer power mode. Both the first and second vehicles in the diagram may resemble the vehicle 201 shown in FIG. 2, such that both the first and second vehicles have a control device, a communication device, a propulsion system, a display device, and an input device. The swim lane diagram shows an input/output (I/O) device 306 and a communication device 308 of the first vehicle and a communication device 310 of the second vehicle. The I/O device 306 could represent the display device 214 and the input device 208 shown in FIG. 2. The communication devices 308, 310 could each represent the communication device 204 shown in FIG. 2. The operations described in the swim lane diagram involve the respective control devices of the vehicles, but the control devices are not explicitly shown in the diagram. The identifiers "first" and "second" are merely to distinguish between the vehicles shown in FIG. 3, such that the vehicle designated as remote could alternatively be referred to as the first vehicle and the vehicle designated as lead could alternatively be referred to as the second vehicle. Furthermore, although only one vehicle designated as remote is shown in FIG. 3, the method could be used to concurrently discover and configure multiple vehicles as remote in the distributed power arrangement. The vehicle designated as remote in FIG. 3 is representative of each vehicle that is to be configured as a remote vehicle.

Prior to initiating the method 300, the first and second vehicles may both be in the conventional mode of operation. The method 300 starts at 312, at which the communication device of the second vehicle (designated as remote) scans channels within a frequency range. For example, the control system may control the communication device to scan multiple channels in the frequency range one at a time to listen for or detect a discover message. The frequency range may be a range that is used by the radios on vehicles to communicate with each other. For example, each vehicle optionally may have a designated channel within the frequency range that is associated with that vehicle. The communication device may periodically scan each radio channel for a predetermined period of time (e.g., for x seconds per channel). According to an embodiment, all vehicles in the conventional mode are configured to periodically scan, as described above, for discover messages. This differs from known vehicle systems that may turn off the communication device (e.g., radio) or ignore received communications when in the conventional mode.

At 314, a user input is received via the I/O device on the first vehicle (designated as lead) to initiate discovery. For example, an operator may enter the vehicle that is selected for use as the lead vehicle in the distributed power arrangement. The operator may utilize the I/O device to configure the first vehicle as the lead and to initiate the discovery of available vehicles that can be configured as remote. The initiation on the first vehicle occurs independent from the scanning on the second vehicle. Upon initiation, the control device on the first vehicle generates a discover message that is communicated by the communication device at 316. The discover message is essentially a beacon that is broadcast on a frequency channel within the frequency range. The frequency channel may be a specific channel that is associated with and/or assigned to the first vehicle. The communication device on the first vehicle locks on that channel and periodically communicates the discover message for at least a designated amount of time. The period and designated amount of time may be selected to ensure that every listening vehicle in proximity to the communication device is able to receive the discover message when scanning through the channels in the frequency range. For example, the discover message may be communicated more frequently than the frequency at which the listening vehicles switch channels. In a non-limiting example, the discover message may be broadcast every x/3 seconds for at least 2nx total seconds, where x is the amount of time that the listening vehicles listen on each channel before switching channels and n is the total number of available channels in the frequency range.

At 318, the communication device of the second vehicle receives the discover message while scanning when listening to the channel on which the discover message is communicated. The control device of the second vehicle analyzes the discover message, and generates a discover reply message that is communicated back to the first vehicle by the communication device at 320. The discover reply message includes an identifier of the second vehicle to indicate the source of the discover reply message. The identifier may include a unique identification number of the second vehicle, such as a railroad number and unit number if the second vehicle is a rail vehicle. The discover reply message is transmitted by the communication device of the second vehicle on the same channel that the discover message is received. For example, upon receiving the discover message on the channel, the communication device of the second vehicle may lock onto that channel for at least a designated amount of time for additional communications with the first vehicle. The second vehicle may be in a discovered state during the period of time that the second vehicle is locked onto that channel. The discover reply message may be unicast or transmitted to the first vehicle, as opposed to broadcasting. In an embodiment, the control device of the second vehicle is configured to only transmit the discover reply message if the second vehicle is parked. Parked vehicles are stationary (e.g., speed of zero) with the brakes applied. Vehicles that are moving may not be permitted to join a distributed power arrangement for safety reasons.

At 322, the communication device onboard the first vehicle receives the discover reply message from the second vehicle. The control device analyzes the discover reply message to extract the identifier of the second vehicle. At this stage, the first vehicle may receive a discover reply message from multiple different vehicles that are in sufficient proximity to the first vehicle to receive the broadcasted discover message. The control device may compile the identifiers and other information received in the various discover reply messages into a list that is then displayed on the display device at 324. The list represents discovered vehicles that are available for forming a distributed power arrangement with the first vehicle. The identifier of the second vehicle is included in the list. At 326, the I/O device receives a user input that selects one or more of the identifiers in the displayed list. In an embodiment, the operator may select the identifiers based on a vehicle system makeup or manifest, which is a preformulated document that designates specific vehicles to be included in a vehicle system for an upcoming trip. The manifest may also designate specific vehicles to be included in the distributed power arrangement. For example, referring to FIG. 1, the manifest may indicate that vehicles 104A-C are intended to form a distributed power arrangement in the vehicle system 100 with the vehicles 104B and 104C operating as remotes. By reviewing the manifest, the operator onboard the vehicle 104A designated as lead can then select the identifiers in the displayed list associated with the vehicles 104B and 104C. The list may also include identifiers of propulsion-generating vehicles parked nearby that are not intended to be included in the vehicle system, or at least the distributed power arrangement, so the operator does not select those vehicles.

In an alternative embodiment, the vehicle system manifest may be uploaded or received by the control device of the first vehicle and stored in the memory. Upon receiving the discover reply messages from various parked propulsion-generating vehicles nearby, the control device may automatically compare the received identifiers to the vehicles designated in the manifest. The control device may automatically determine the intended vehicles from the list of received identifiers that are present in the manifest. This alternative embodiment is more autonomous because it does not include or at least require operator input to select the vehicle or vehicles at 326.

At 328, the control device on the first vehicle generates a configure message that is communicated to each of the selected available vehicles. In the illustrated embodiment, the communication device transmits the configure message to the second vehicle on the channel to which both communication devices are locked. The configure message instructs the second vehicle and any other recipients to transition to the remote distributed power mode of operation. Only the vehicles associated with the selected identifiers from the list (e.g., that are in the manifest) receive the configure message. The configure message may also include information about the first vehicle that is designated as the lead, such as an identifier of the first vehicle.

The communication device of the second vehicle receives the configure message at 330. At 332, the control device of the second vehicle reconfigures the second vehicle from the conventional mode to the remote mode in response to receiving the configure message. In the remote mode, tractive and braking efforts of the second vehicle are controlled by remote control signals transmitted by the first vehicle, and local control signals from input devices onboard the second vehicle are disabled (except for special situations such as emergencies). The control device may perform several operations to configure the second vehicle in the remote mode, such as actuating switches that disconnect onboard input devices, such as throttle levers and other control devices, from the propulsion system. After configuring in the remote mode, the control device of the second vehicle generates a configure reply message that is sent back to the first vehicle by the communication device at 334. The configure reply message indicates that the second vehicle is in the remote mode of operation and is configured to operate based on control signals received from the first vehicle designated as the lead.

The second vehicle may be configured to reconvert to the conventional mode if the configure process does not occur or complete within a designated amount of time. For example, after sending the discover reply message at 320, the control device of the second vehicle may monitor the elapsed time. If the configure message at 330 is not received for at least a designated threshold time period (e.g., 1 minute, 5 minutes, or the like) after sending the discover reply message, then the second vehicle returns to the conventional mode. Once back in the conventional mode, the communication device is no longer locked to that communication channel with the first vehicle (e.g., the second vehicle is no longer in the discovered state).

Returning now to the diagram 300, the communication device of the first vehicle receives the configure reply message at 336. Optionally, the control device may compile a list of vehicle identifiers associated with the vehicles that are configured as remote, and display the list of configured vehicles on the display device at 338. This list enables the operator to confirm and select which vehicles are intended to link with the lead vehicle in the distributed power arrangement. The operator may use the onboard I/O device at 340 to make a final selection of the vehicles with which to link. The receipt of the user selection initiates the linking process between the first vehicle and the second vehicle (as well as between the first vehicle and any other remote vehicles to be included in the distributed power arrangement). In an alternative embodiment, the control device of the first vehicle automatically initiates the linking process after receiving the configure reply messages from each remote-configured vehicle (or after a given period of time has elapsed) without displaying the list of configured vehicles at 338 and waiting for user input at 340. Stated differently, the display of the configured vehicles in the list may be omitted to reduce manual involvement and reduce delay.

The linking process begins at 342, in which the control device of the first vehicle generates a link command message that is sent by the communication device to the second vehicle (and to any other selected remote vehicles). The link command message specifies the guidelines, protocol, or characteristics for the communications between the vehicles in the distributed power arrangement. For example, the link command message may specify which radio to use (if multiple are available), which channel to use, the timing between messages, channel switching, encryption, what to do if a message is dropped, and the like. The link command message is also a confirmation that the two vehicles are now ready to operate as a unit. The link command message may be communicated on the same channel as the previous messages. The second vehicle receives the link command message at 344. The control device of the second vehicle generates a link reply message in response, that is transmitted back to the first vehicle at 346. Upon receipt of the link reply message by the first vehicle at 348, the two vehicles are now linked and the operations of the remote vehicle are not controlled by the lead vehicle.

For example, at 350, the control device of the lead (first) vehicle generates a control message that is transmitted by the communication device to the remote (second) vehicle. The control message designates tractive and/or braking settings to be implemented by the second vehicle to control the movement of the second vehicle along a route. The remote vehicle receives the control message via the communication device at 352, and the control device implements the designated tractive and/or braking settings of the control message at 354. For example, the control message may instruct the remote vehicle to switch to throttle setting notch 5 at a designated time, and the control device of the remote vehicle generates a control signal to control the propulsion system of the remote vehicle to switch to notch 5 at the designated time. Although not shown, the remote vehicle may generate and communicate a control reply message to inform the lead vehicle that the control message was received and the remote vehicle will or has implemented the orders. The lead vehicle may communicate additional control messages to the second vehicle over time, such that the steps 350, 352, 354, and the optional reply message may repeat.

In an embodiment, at 356, the second vehicle is configured to reconvert to the conventional mode if the linking process does not occur or complete within a designated amount of time. For example, after sending the configure reply message at 334, the control device of the second vehicle may monitor the elapsed time. If the link command message is not received for at least a designated threshold time period (e.g., 1 minute, 5 minutes, or the like) after sending the configure reply message, then the second vehicle returns to the conventional mode. Once back in the conventional mode, the communication device is no longer locked to that communication channel with the first vehicle. The communication device may be controlled to once again initiate the scanning process at 312.

In one or more embodiments, a system (e.g., a distributed power system) includes a communication device and a control device. The communication device is disposed onboard a first vehicle of a vehicle system that also includes at least a second vehicle. The communication device is configured to communicate a discover message. The control device is operatively connected to the communication device, and is configured to, responsive to the communication device receiving a discover reply message from a second vehicle, generate a configure message for the communication device to transmit to the second vehicle based on an identifier of the second vehicle included in the discover reply message. The configure message includes instructions for the second vehicle to transition to a remote mode of operation in which remote control of tractive and braking efforts of the second vehicle along a route is enabled.

Optionally, the controller is configured to generate remote-control signals for the communication device to transmit to the second vehicle subsequent to communicating the configure message. The remote-control signals include tractive settings and brake settings to be implemented by the second vehicle to coordinate movement of the second vehicle with the first vehicle along the route. Optionally, the communication device is configured to communicate the discover message on a frequency channel, receive the discover reply message on the frequency channel, and transmit the configure message on the frequency channel.

Optionally, the system also includes a display device and a user input device operatively connected to the control device. The control device is configured to display the identifier of the second vehicle on the display device based on the discover reply message that is received. The control device is configured to generate the configure message responsive to receipt of a user input on the user input device that selects the identifier of the second vehicle that is displayed.

Optionally, the control device is configured to compare the identifier of the second vehicle received in the discover reply message to a list of designated remote vehicles in a trip manifest. The control device is configured to generate the configure message in response to determining that the second vehicle is present in the list of designated remote vehicles. Optionally, the configure message includes instructions for the second vehicle to disable non-emergency control inputs entered onboard the second vehicle for controlling movement of the second vehicle.

Optionally, responsive to the communication device receiving a configure reply message from the second vehicle indicating that the second vehicle is in the remote mode of operation, the control device is configured to generate a link command message for the communication device to transmit to the second vehicle. The link command message includes guidelines for communication of the remote-control signals and reply signals between the first and second vehicles during movement of the first and second vehicles along the route.

Optionally, the communication device is a radio, and the first vehicle is a locomotive. Optionally, the communication device is configured to broadcast the discover message and unicast the configure message.

In one or more embodiments, a method for establishing a vehicle distributed power arrangement includes communicating a discover message from a first vehicle and receiving a discover reply message at the first vehicle. The discover reply message includes an identifier of a second vehicle from which the discover reply message is communicated. The method also includes communicating a configure message from the first vehicle to the second vehicle based on the identifier in the discover reply message. The configure message instructs the second vehicle to transition to a remote mode of operation in which remote control of tractive and braking efforts of the second vehicle is enabled.

Optionally, the discover message is communicated on a frequency channel, the discover reply message is received on the frequency channel, and the configure message is communicated on the frequency channel.

Optionally, the method also includes transmitting the remote control signals from the first vehicle to the second vehicle subsequent to communicating the configure message. The remote control signals designate tractive settings and brake settings to be implemented by the second vehicle to coordinate movement of the second vehicle with the first vehicle along the route.

Optionally, the method includes displaying the identifier of the second vehicle on a display device based on the discover reply message. The configure message is communicated in response to receipt of a user input, via a user input device, that selects the identifier of the second vehicle.

Optionally, the method also includes comparing the identifier of the second vehicle received in the discover reply message to a list of designated remote vehicles in a trip manifest. The configure message is communicated in response to determining that the second vehicle is included in the list of designated remote vehicles.

Optionally, in the remote mode of operation, the second vehicle disables non-emergency control inputs entered onboard the second vehicle for controlling movement of the second vehicle. Optionally, the second vehicle is in a conventional mode of operation at a time that the second vehicle receives the configure message. In the conventional mode, movement of the second vehicle is controlled according to control inputs entered onboard the second vehicle.

Optionally, the method also includes receiving a configure reply message at the first vehicle from the second vehicle. The configure reply message indicates that the second vehicle is in the remote mode of operation. Responsive to receiving the configure reply message, the method may include transmitting a link command message from the first vehicle to the second vehicle. The link command message specifies characteristics for communication of the remote control signals and reply signals between the first and second vehicles during movement of the first and second vehicles along the route.

Optionally, the discover message and the configure message are wirelessly communicated by a radio onboard the first vehicle. The discover message may be broadcast from the first vehicle, and the configure message may be unicast from the first vehicle to the second vehicle. Optionally, the first and second vehicles are locomotives.

In one or more embodiments, a method for establishing a vehicle distributed power arrangement includes scanning, at a radio onboard a first vehicle, multiple channels in a frequency range to detect a discover message communicated from a second vehicle. Responsive to detecting the discover message in the frequency range, the method includes communicating a discover reply message from the first vehicle to the second vehicle. The discover reply message includes an identifier of the first vehicle. The method also includes receiving a configure message at the first vehicle from the second vehicle subsequent to communicating the discover reply message, and, responsive to receiving the configure message, configuring the first vehicle in a remote mode of operation in which remote control of tractive and braking efforts of the first vehicle is enabled.

Optionally, the method includes determining that the first vehicle is stationary prior to communicating the discover reply message to the second vehicle. Optionally, the method includes receiving, at the first vehicle, the remote-control signals transmitted by the second vehicle, and implementing the remote-control signals to control movement of the first vehicle along the route. Optionally, configuring the first vehicle in the remote mode of operation includes disabling non-emergency control inputs entered onboard the first vehicle.

Optionally, the discover reply message is communicated on a channel in the frequency range which is the channel on which the discover message is detected. The method may also include transmitting a configure reply message to the second vehicle on the channel. The configure reply message indicates that the first vehicle is in the remote mode of operation. Responsive to not receiving a link command message at the first vehicle for at least a designated time period after transmitting the configure reply message, the method may include reconfiguring the first vehicle in a conventional mode of operation and rescanning the multiple channels in the frequency range to detect another discover message. The method may also include receiving a link command message at the first vehicle from the second vehicle subsequent to transmitting the configure reply message. The link command message specifies characteristics for communication of the remote control signals and reply signals between the first and second vehicles during movement of the first and second vehicles along the route.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   a communication device configured to be disposed onboard a first vehicle of a vehicle system that also includes at least a second vehicle, the communication device configured to communicate a discover message on a plurality of frequency channels in a frequency range, wherein the communication device locks on a first frequency channel of the plurality of frequency channels for at least a designated amount of time, and wherein the designated amount of time ensures that every listening vehicle in proximity to the first vehicle is able to receive the discover message when scanning through the frequency range; and
   a control device configured to be operatively connected to the communication device, the control device configured to, responsive to the communication device receiving a discover reply message from the second vehicle on the first frequency channel of the plurality of frequency channels, generate a configure message for the communication device to transmit to the second vehicle based on an identifier of the second vehicle included in the discover reply message, the configure message including instructions for the second vehicle to transition from a conventional mode of operation, in which control inputs are manually entered onboard the second vehicle, to a remote distributed power mode of operation in which remote control of tractive and braking efforts of the second vehicle is enabled for a distributed power arrangement, wherein the second vehicle transmits a configure reply message to the first vehicle and locks onto the first frequency channel of the plurality of frequency channels for at least the designated amount of time for additional communications with the first vehicle; and
   responsive to the communication device receiving the configure reply message from the second vehicle indicating that the second vehicle is in the remote distributed power mode of operation, the control device is configured to generate a link command message for the communication device to transmit to the second vehicle, the link command message specifying a communication protocol, a frequency channel, and encryption for communication of remote-control signals and reply signals between the first vehicle and the second vehicle during movement of the first vehicle and the second vehicle along a route, and wherein the command link message completes a linking process for the second vehicle in the distributed power arrangement.

2. The system of claim 1, wherein the control device is configured to generate remote-control signals for the communication device to transmit to the second vehicle subsequent to communicating the configure message, the remote-control signals including tractive settings and brake settings to be implemented by the second vehicle.

3. The system of claim 1, wherein the communication device is configured to communicate the discover message on the frequency channel, receive the discover reply message on the frequency channel, and transmit the configure message on the frequency channel.

4. The system of claim 1, further comprising a display device and a user input device operatively connected to the control device, the control device configured to display the identifier of the second vehicle on the display device based on the discover reply message that is received, and the control device is configured to generate the configure message responsive to receipt of a user input on the user input device that selects the identifier of the second vehicle that is displayed.

5. The system of claim 1, wherein the control device is configured to compare the identifier of the second vehicle received in the discover reply message to a list of designated remote vehicles, and the control device is configured to generate the configure message in response to determining that the second vehicle is present in the list of designated remote vehicles.

6. The system of claim 1, the instructions for the second vehicle to disable non-emergency control inputs entered onboard the second vehicle for controlling movement of the second vehicle.

7. The system of claim 1, wherein, responsive to the communication device receiving a configure reply message from the second vehicle indicating that the second vehicle is in the remote distributed power mode of operation, the control device is configured to generate a link command message for the communication device to transmit to the second vehicle, the link command message including guidelines for communication of remote-control signals and reply signals between the first and second vehicles during movement of the first and second vehicles along a route.

8. The system of claim 7, wherein the first vehicle is designated as a lead distributed power vehicle in the distributed power arrangement, and the second vehicle assumes a role of remote distributed power vehicle in the distributed power arrangement upon receipt of the link command message from the first vehicle.

9. The system of claim 1, wherein the communication device is a radio, and the first vehicle is a locomotive.

10. The system of claim 1, wherein the communication device is configured to broadcast the discover message and unicast the configure message.

11. A method comprising:
communicating, by a communication device of a first vehicle, a discover message on a plurality of frequency channels in a frequency range, wherein the communication device locks on a first frequency channel of the plurality of frequency channels for at least a designated amount of time, and wherein the designated amount of time ensures that every listening vehicle in proximity to the first vehicle is able to receive the discover message when scanning through the frequency range;
receiving, by the communication device of the first vehicle, a discover reply message including an identifier of a second vehicle from which the discover reply message is communicated, wherein the second vehicle locks onto the first frequency channel of the plurality of frequency channels for at least the designated amount of time for additional communications with the first vehicle;
communicating, by the communication device of the first vehicle, a configure message to the second vehicle based on the identifier in the discover reply message, wherein the configure message instructs the second vehicle to transition from a conventional mode of operation, in which control inputs are manually entered onboard the second vehicle, to a remote distributed power mode of operation in which remote control of tractive and braking efforts of the second vehicle is enabled for a distributed power arrangement;
receiving, by the communication device of the first vehicle, a configure replay message from the second vehicle, indicating that the second vehicle is in the remote distributed power mode of operation; and
communicating, by the communication device of the first vehicle, a link command message to the second vehicle, wherein the command link message completes a linking process for the second vehicle in the distributed power arrangement, and wherein the link command message specifies a communication protocol, a frequency channel, and encryption for communication of remote-control signals and reply signals between the first vehicle and the second vehicle during movement of the first vehicle and the second vehicle along a route.

12. The method of claim 11, wherein the discover message is communicated on the frequency channel, the discover reply message is received on the frequency channel, and the configure message is communicated on the frequency channel.

13. The method of claim 11, further comprising transmitting remote control signals from the first vehicle to the second vehicle subsequent to communicating the configure message, the remote-control signals designating tractive settings and brake settings to be implemented by the second vehicle.

14. The method of claim 11, further comprising displaying the identifier of the second vehicle on a display device based on the discover reply message, wherein the configure message is communicated in response to receipt of a user input, via a user input device, that selects the identifier of the second vehicle.

15. The method of claim 11, further comprising comparing the identifier of the second vehicle received in the discover reply message to a list of designated remote vehicles, wherein the configure message is communicated in response to determining that the second vehicle is included in the list of designated remote vehicles.

16. The method of claim 11, further comprising, responsive to receiving a configure reply message at the first vehicle from the second vehicle, transmitting a link command message from the first vehicle to the second vehicle, the link command message specifying characteristics for communication of remote-control signals and reply signals between the first and second vehicles during movement of the first and second vehicles along a route.

17. The method of claim 11, wherein communicating the discover message comprises broadcasting the discover message from the first vehicle, and communicating the configure message comprises unicasting the configure message from the first vehicle to the second vehicle.

18. A method comprising:
scanning, at a radio onboard a first vehicle in a conventional mode of operation, a plurality of channels in a frequency range to detect a discover message communicated from a second vehicle that is designated as lead distributed power vehicle in a distribute power arrangement;

locking-on, by the first vehicle, to a first channel of the plurality of channels for at least a designated amount of time, wherein the designated amount of time ensures that every listening vehicle in proximity to the first vehicle is able to receive the discover message when scanning through the frequency range;

responsive to detecting the discover message in the frequency range communicating a discover reply message from the first vehicle to the lead distributed power vehicle, the discover reply message including an identifier of the first vehicle;

receiving a configure message at the first vehicle from the lead distributed power vehicle subsequent to communicating the discover reply message; and responsive to receiving the configure message, configuring the first vehicle from the conventional mode of operation to a remote distributed power mode of operation in which remote control of tractive and braking efforts of the first vehicle is enabled for a distributed power arrangement and non-emergency control inputs entered onboard the first vehicle are disabled;

communicating, by the first vehicle, a configure replay message to the lead distributed power vehicle, indicating that the first vehicle is in the remote distributed power mode of operation;

determining, by the first vehicle, a link command message was not received in a designated time period after communicating the configure reply message, and wherein a linking process does not occur within the designated time period; and responsive to not receiving a link command message at the first vehicle from the lead distributed power vehicle for the designated time period after communicating the configure reply message, reconfiguring the first vehicle in the conventional mode of operation and rescanning the plurality of channels in the frequency range to detect another discover message.

19. The method of claim 18, further comprising determining that the first vehicle is stationary prior to communicating the discover reply message to the lead distributed power vehicle.

* * * * *